United States Patent
Peng

(10) Patent No.: US 9,134,104 B2
(45) Date of Patent: Sep. 15, 2015

(54) MOBILE MEASURING PLATFORM FOR PRECISION MEASURING SYSTEM

(75) Inventor: Xue-Fei Peng, Shenzhen (CN)

(73) Assignee: JI ZHUN PRECISION INDUSTRY (HUI ZHOU) CO., LTD., Huizhou (CN)

( * ) Notice: Subject to any disclaimer, the term of this patent is extended or adjusted under 35 U.S.C. 154(b) by 978 days.

(21) Appl. No.: 13/294,391

(22) Filed: Nov. 11, 2011

(65) Prior Publication Data

US 2012/0217692 A1    Aug. 30, 2012

(30) Foreign Application Priority Data

Feb. 28, 2011   (CN) .......................... 2011 1 0047648

(51) Int. Cl.
*G01B 5/00* (2006.01)
*B25B 1/10* (2006.01)
*B25B 5/02* (2006.01)

(52) U.S. Cl.
CPC .............. *G01B 5/0004* (2013.01); *B25B 1/103* (2013.01); *B25B 5/02* (2013.01)

(58) Field of Classification Search
CPC ........ B25B 1/103; B25B 1/2421; B25B 1/00; B25B 1/02; B25B 5/02
See application file for complete search history.

(56) References Cited

U.S. PATENT DOCUMENTS

| | | | | |
|---|---|---|---|---|
| 5,052,092 A * | 10/1991 | Vallauri et al. | ............. | 29/234 |
| 6,254,076 B1 * | 7/2001 | Goldin | ............. | 269/285 |
| 7,293,765 B2 * | 11/2007 | Hooper | ............. | 269/246 |
| 8,573,578 B1 * | 11/2013 | Warth | ............. | 269/244 |
| 2012/0217692 A1 * | 8/2012 | Peng | ............. | 269/60 |

* cited by examiner

*Primary Examiner* — Lee D Wilson
(74) *Attorney, Agent, or Firm* — Novak Druce Connolly Bove + Quigg LLP

(57) ABSTRACT

A mobile measuring platform, comprises a fixing seat; a driving assembly fixed to the fixing seat, the driving assembly comprises an electric motor and a leadscrew driven by the electric motor; two leading guides mounted on the fixing seat; each of the two leading guides comprises a slide member parallel to the leadscrew, and a guide track slidably sleeved on the slide member; a sliding assembly fixed to the guide track of each of the two leading guides; and a driving guide comprising a slide member perpendicular to the leadscrew and a guide track slidably sleeved on the slide member of the driving guide; wherein the guide track of the driving guide is driven by the electric motor via the leadscrew, the slide member of the driving guide is fixed to the sliding assembly, and the two leading guides and the driving guide are all gas hydrodynamic guides.

13 Claims, 4 Drawing Sheets

MOBILE MEASURING PLATFORM FOR PRECISION MEASURING SYSTEM

BACKGROUND

1. Technical Field

The present disclosure relates to precision measuring systems, particularly to a mobile measuring platform for a precision measuring system.

2. Description of Related Art

Mobile measuring platforms are widely used in measuring devices. A general mobile measuring platform may include a ball bearing slide, a leadscrew slidably mounted on the ball bearing slide, and an electric motor for driving the leadscrew. The ball bearing slide offers smooth precision motions along a single-axis linear design with self-lubrication properties which increase reliability. However, it may be difficult to avoid vibrations of the leadscrew during operations due to poor machining accuracies of the leadscrew, and imperfect rollings of a ball of the ball bearing slide.

Therefore, there is room for improvement in the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the mobile measuring platform. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
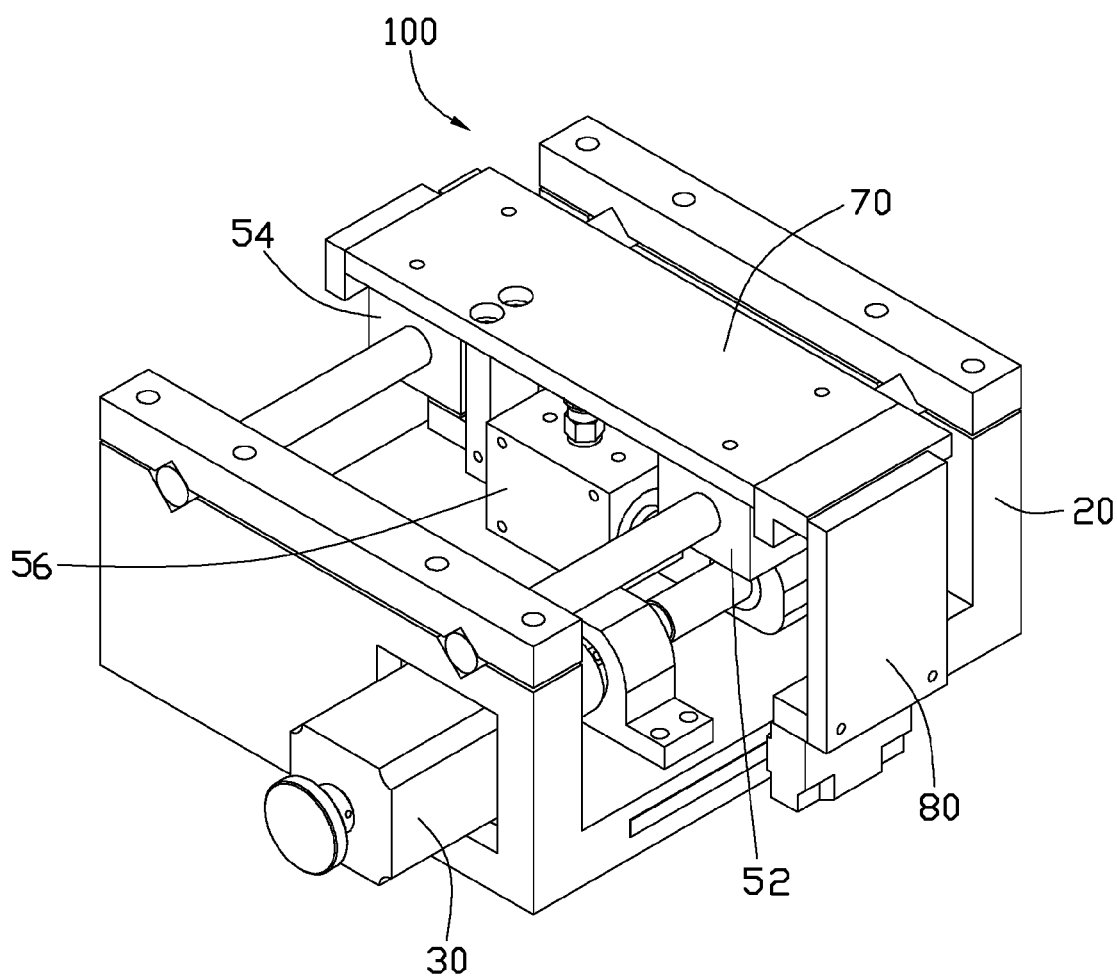
FIG. 1 is an isometric view of an embodiment of a mobile measuring platform.
Figure 2:
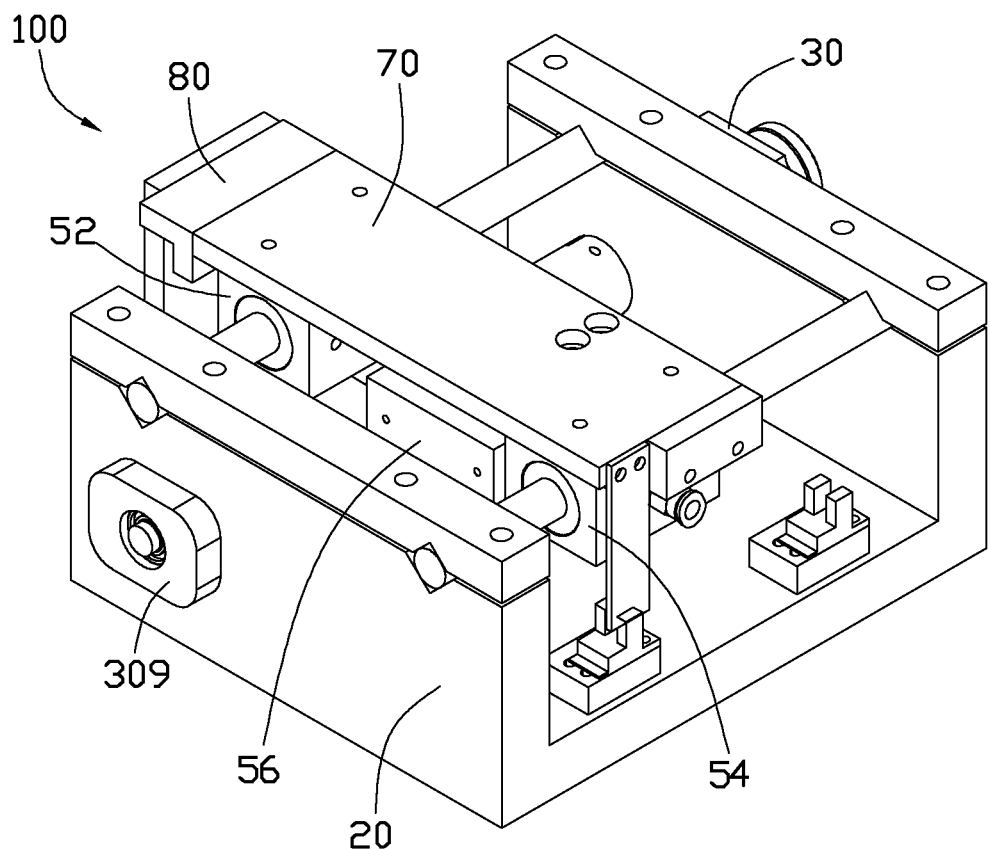
FIG. 2 is similar to FIG. 2, but viewed from another aspect.

Referring to FIGS. 1 and 2, an embodiment of a mobile measuring platform 100 includes a fixing seat 20, a driving assembly 30, leading guide 52, leading guide 54, a driving guide 56, a sliding assembly 70, and a grating ruler 80. The leading guides 52 and 54, and the driving assembly 30 are fixed to the fixing seat 20. The sliding assembly 70 is fixed on the leading guides 52 and 54, and the grating ruler 80 is fixed to the distal end of the sliding assembly 70.

Figure 3:
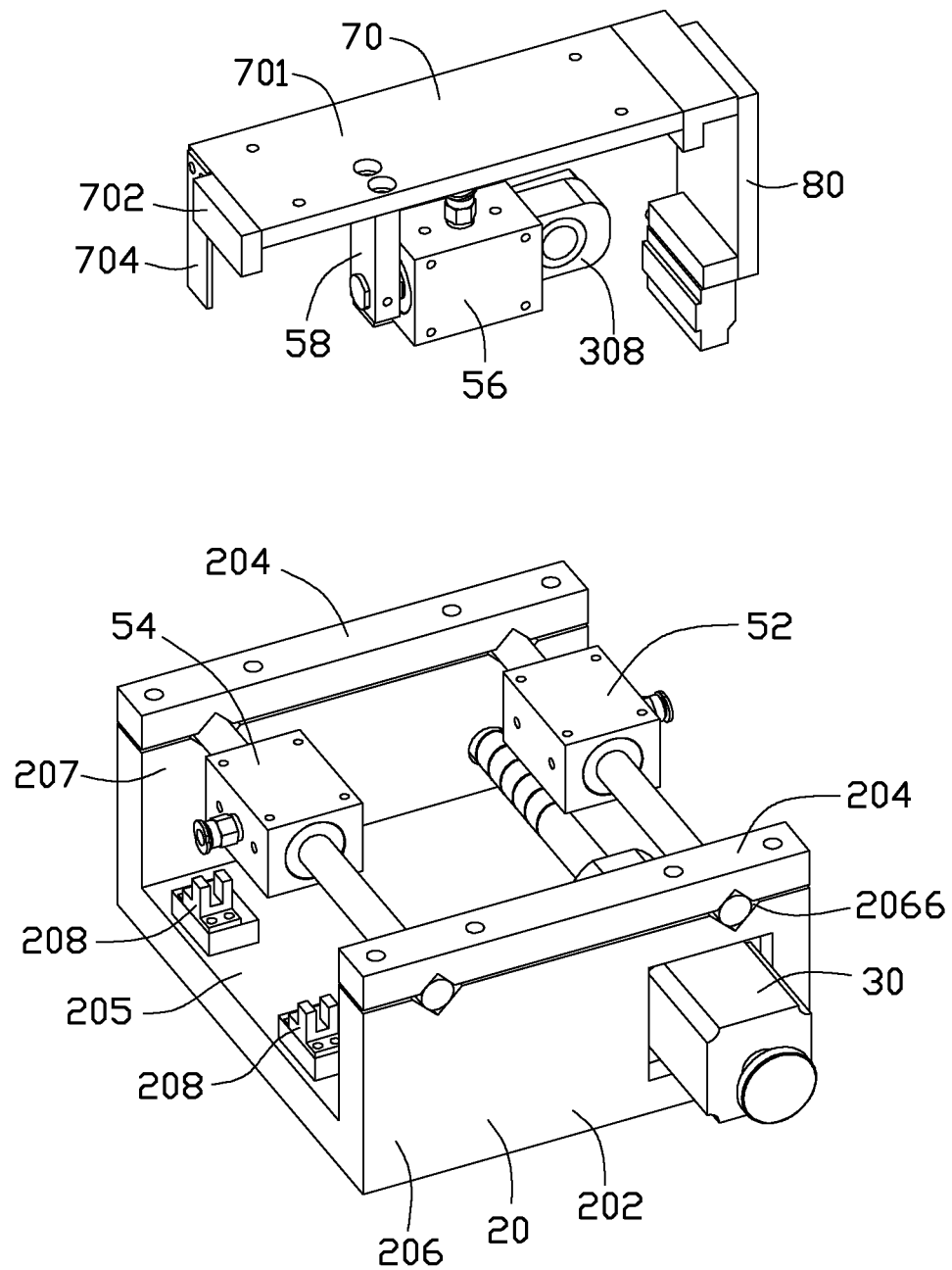
FIG. 3 is a partly exploded, isometric view of the mobile measuring platform of FIG. 1.
Figure 4:
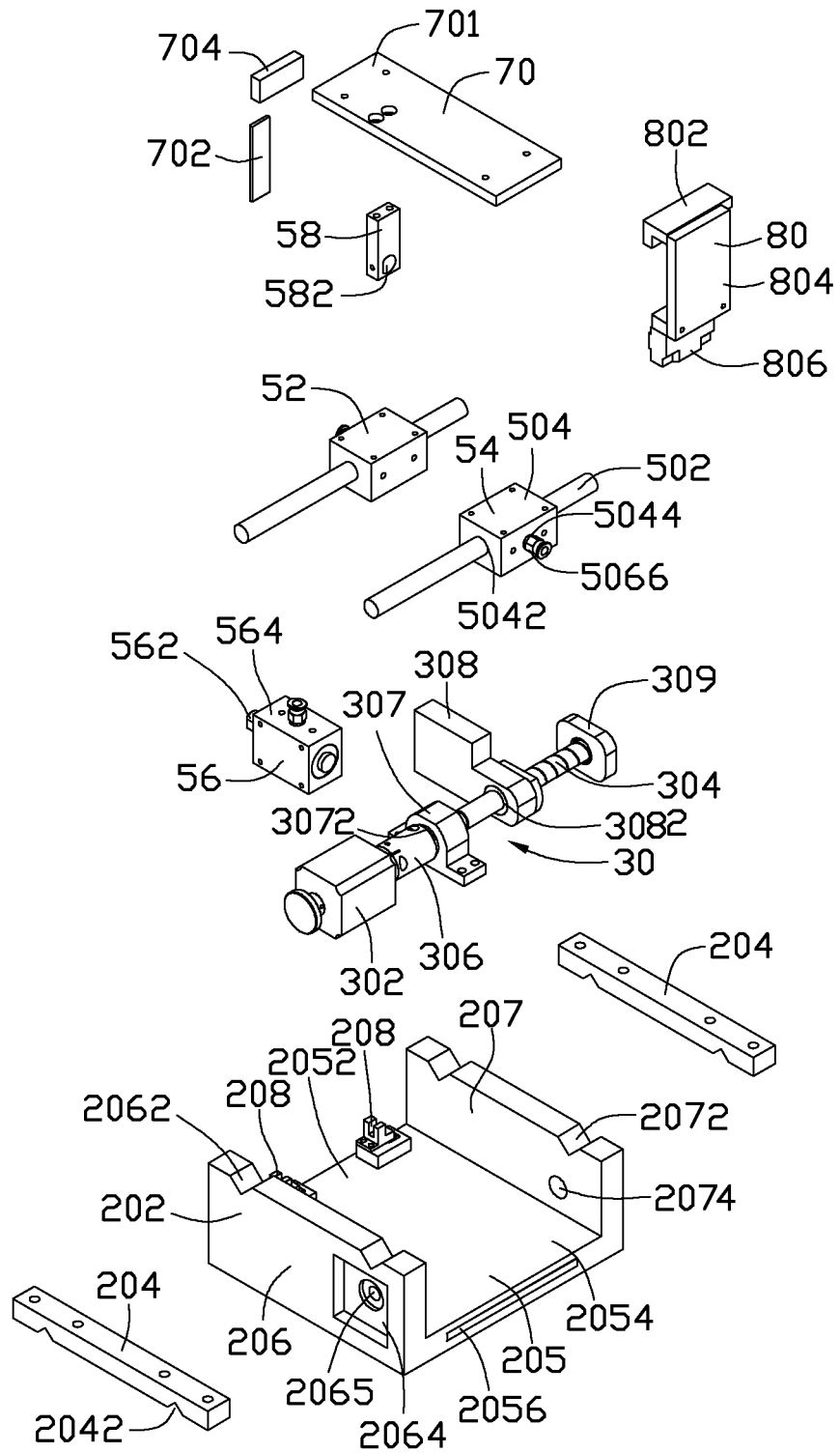
FIG. 4 is an exploded, isometric view of the mobile measuring platform of FIG. 1.

Referring to FIGS. 3 and 4, the fixing seat 20 comprises a mounting bracket 202, and a fixing member 204 fixed on two opposite ends of the mounting bracket 202. In the illustrated embodiment, the mounting bracket 202 is a substantially U-shaped sheet. The mounting bracket 202 comprises a base plate 205, a first sidewall 206, and a second sidewall 207. The first sidewall 206 and the second sidewall 207 substantially perpendicularly extending from two opposite ends of the base plate 205. The base plate 205 is substantially rectangular. The base plate 205 comprises a restraining end 2052, and a measuring end 2054. Both the restraining end 2052 and the measuring end 2051 are at right angles to the sidewalls 206 and 207. The fixing seat 20 further comprises two in-line restraining members 208 at the restraining end 2052, and a scale grating 2056 at the measuring end 2054. Distal ends of the sidewalls 206 and 207, away from the base plate 205, define fixing grooves 2062 and 2072, respectively. In the illustrated embodiment, each of the fixing grooves 2062, 2072 is a deep V-shaped groove. An outer surface of the first sidewall 206 defines a rectangular recess, rectangular groove 2064 adjacent to the measuring end 2054. A mounting hole 2065 is centrally defined at a bottom surface of the rectangular groove 2064. The second sidewall 207 defines a pivoting hole 2074 aligned with the mounting hole 2065.

The fixing member 204 is a bar of material. The fixing member 204 defines two fixing grooves 2042 which correspond to the fixing grooves 2062 and 2072. Each of two the fixing grooves 2042 of the fixing member 204 is V-shaped and mirrors the fixing grooves 2062 and 2072 of the first and the second side walls 206 and 207. The fixing member 204 is fixed on each of the first and the second sidewalls 206, 207, such that each of the two fixing grooves 2042 and each of the fixing grooves 2062 and 2072 cooperatively define a rectangular hole 2066 configure to accommodate, and to clamp the leading guides 52 and 54. Thus, the leading guides 52, 54 are fixed on the first and the second sidewalls 206, 207 of the fixing seat 20.

The driving assembly 30 comprises an electric motor 302, a leadscrew 304, a shaft joint 306, a bearing seat 307, a screw nut seat 308, and a leadscrew hanger bearing 309. The shaft joint 306 interconnects the electric motor 302 and the leadscrew 304. The bearing seat 307 is fixed on the base plate 205, and defines a through hole 3072 for the shaft joint 306. An end of the leadscrew 304 is fixed to an end of the shaft joint 306, and another end of the leadscrew 304 passes through the pivoting hole 2074 of the second sidewall 207, and finally is fixed by the leadscrew hanger bearing 309 at an outer surface of the second sidewall 207 away from the sidewall 206. The leadscrew 304 can be rotated but cannot move longitudinally. The electric motor 302 is fixed to the bottom surface of the rectangular groove 2064 of the first sidewall 206, and one end of the electric motor 302 is received in the mounting hole 2065. The screw nut seat 308 defining a through hole 3082 for the leadscrew 304 to pass through and is fixedly sleeved on the leadscrew 304 for interconnecting the leadscrew 304 and the driving guide 56.

In the illustrated embodiment, the leading guides 52, 54, and the driving guide 56 are all gas hydrodynamic guides. Each of the leading guides 52, 54 comprise a slide member 502, and a guide track 504 slidably sleeved on the slide member 502. The guide track 504 is a cuboid and defines a through hole 5042. The slide member 502 is a substantial round pole. The slide member 502 is inserted in the through hole 5042. The guide track 504 further defines an air inlet 5044 communicating with the through hole 5042 at a sidewall (not labeled) of the guide track 504. Each of the leading guides 52, 54 further comprises an input plug 5066 fixed in the air inlet 5044. When compressed air is pumped into the through hole 5042 via the air inlet 5044, the compressed air escapes between the slide member 502 and the guide track 504. Friction between the slide member 502 and the guide track 504 may be reduced because of the cushion of air between moving parts.

The driving guide 56 comprises a slide member 562, and a guide track 564 slidably sleeved on the slide member 562. In the illustrated embodiment, the driving guide 56 is similar to the leading guides 52, 54, except that a length of the slide member 562 is less than that of the slide member 502. In alternative embodiments, any of the leading guides 52, 54 or the driving guide 56 can be replaced by a liquid hydrostatic guide.

The two leading guides 52, 54 are mounted on the fixing seat 20 when an end of each slide member 502 is received and clamped in each rectangular hole 2066. In the illustrated embodiment, each slide member 502 is parallel to the leadscrew 304. The guide track 564 of the driving guide 56 is fixed to the screw nut seat 308, and the slide member 562 of the driving guide 56 is substantially perpendicular to the leadscrew 304. The mobile measuring platform 100 further comprises a vertical connecting member 58 defining a horizontal fixing hole 582 at a lower end of the vertical connecting member 58. The horizontal fixing hole 582 is configured to connect the vertical connecting member 58 to an end of the slide member 562 which is furthest from the leadscrew 304. A top end of the vertical connecting member 58 is fixed to the sliding assembly 70.

The sliding assembly 70 comprises a substantially rectangular main body 701, a sensor 702, and a regulator 704. Each guide track 504 of the leading guides 52, 54 is fixed on an underside of each end of the main body 701. The sensor 702 and the regulator 704 are fixed at an end of the main body 701, above the restraining end 2052 of the base plate 205. The sensor 702 is configured to sense positions of each of the two in-line restraining members 208 to avoid damage to the electric motor 302. The regulator 704 is configured to mechanically adjust lateral positions of the slide members 502.

The grating ruler 80 is fixed to an end of the sliding assembly 70, adjacent to the measuring end 2054 of the base plate 205. In the illustrated embodiment, the grating ruler 80 coordinates with the scale grating 2056, and is adapted for improving precisions of measurements made by the mobile measuring platform 100. The grating ruler 80 comprises a connecting member 802, a fixing member 804, and a grating reading head 806. The connecting member 802 is fixed at an end of the fixing member 804, and is connected to the sliding assembly 70. The grating reading head 806 is fixed at an opposite end of the fixing member 804, and is configured to read values of the scale grating 2056.

In the illustrated embodiment, the guide track 504 of each of the leading guides 52, 54 is fixed to the sliding assembly 70, and the sliding assembly 70 is fixed to the slide member 562 of the driving guide 56 via the vertical connecting member 58. Each guide track 504 and the sliding assembly 70 move as one unit with the sliding member 562. The guide track 564 of the driving guide 56 is fixed to the leadscrew 304 via the screw nut seat 308. The guide track 564 may be advanced or retreated by the leadscrew 304. The leadscrew 304 is rotated by the electric motor 302.

The mobile measuring platform 100 comprise the leading guides 52 and 54, and the driving guide 56. The leading guides 52, 54, and the driving guide 56 are all supplied with compressed air. The driving guide 56 reduces any shaking or stuttering of the leadscrew 304 when advance or retreat the sliding assembly 70, so a smooth and linear movement may be achieved. Accurate measurements of the mobile measuring platform 100 may then be achieved.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A mobile measuring platform, comprising:
   a fixing seat;
   a driving assembly fixed to the fixing seat, the driving assembly comprises an electric motor and a leadscrew driven by the electric motor;
   two leading guides mounted on the fixing seat; each of the two leading guides comprises a slide member parallel to the leadscrew, and a guide track slidably sleeved on the slide member;
   a sliding assembly fixed to the guide track of each of the two leading guides; and
   a driving guide comprising a slide member perpendicular to the leadscrew and a guide track slidably sleeved on the slide member of the driving guide; wherein the guide track of the driving guide is driven by the electric motor via the leadscrew, the slide member of the driving guide is fixed to the sliding assembly, and the two leading guides and the driving guide are all gas hydrodynamic guides.

2. The mobile measuring platform of claim 1 further comprises a regulator at an end of the sliding assembly capable of mechanically adjusting lateral positions of the slide member of each of the two leading guides.

3. The mobile measuring platform of claim 1, wherein the guide track of each of the two leading guides and the driving guide define a through hole, and an air inlet communicating with the through hole at a sidewall of the guide track of each of the tow leading guides.

4. The mobile measuring platform of claim 3, wherein the guide track of each of the two leading guides and the driving guide further comprises an input plug fixed in the air inlet.

5. The mobile measuring platform of claim 1, wherein the fixing seat comprises a mounting bracket and two fixing members; the mounting bracket comprises a base plate, a first sidewall, and a second sidewall, the first and the second sidewalls perpendicularly extend from two opposite ends of the base plate, and each of the two fixing members is fixed on each of the first and the second sidewalls.

6. The mobile measuring platform of claim 5, wherein two opposite ends of each of the first and the second sidewalls, away from the base plate, defines two fixing grooves, each of the two fixing members defines two fixing grooves corresponding to the two fixing grooves of each of the first and the second sidewalls, each of the two fixing members is fixed to each of the first and the second sidewalls, and each of the two fixing grooves of each of the two fixing members and each of the fixing grooves of each of the first and the second sidewalls cooperatively defining a rectangular hole configure to receive each of the two leading guides.

7. The mobile measuring platform of claim 5, wherein the fixing seat further comprises two in-line restraining members at an end of the base plate, and a scale grating at an opposite end of the base plate.

8. The mobile measuring platform of claim 7, the mobile measuring platform further comprises a sensor at an end of the sliding assembly, adjacent to the two in-line restraining members; the sensor is adapted to sense positions of the two in-line restraining member, and to avoid damaging to the electric motor.

9. The mobile measuring platform of claim 5, wherein the first sidewall defines a rectangular groove at an outer surface of the first sidewall, a bottom surface of the rectangular groove defines a mounting hole, the electric motor is fixed to a bottom surface of the rectangular groove with an end of the electric motor received in the mounting hole.

10. The mobile measuring platform of claim 9, wherein the driving assembly further comprises a shaft joint interconnected the electronic motor and the leadscrew, a bearing seat coiled around the shaft joint, and a screw nut seat coiled around the leadscrew.

11. The mobile measuring platform of claim 10, wherein the guide track of the driving guide is fixed to the screw nut seat.

12. The mobile measuring platform of claim 11, the mobile measuring platform further comprises a connecting member defining a fixing hole at an end of the connecting member, an end of the connecting member is fixed at an end of the slide member away from the leadscrew via the fixing hole, and an opposite end of the connecting member is fixed to the sliding assembly.

13. The mobile measuring platform of claim 1 further comprises a grating ruler fixed to the sliding assembly, and the grating ruler comprises a grating reading head at an end of the grating ruler.

\* \* \* \* \*